(12) United States Patent
Ueno (10) Patent No.: US 11,861,650 B2
(45) Date of Patent: *Jan. 2, 2024

(54) SALE DATA PROCESSING DEVICE AND SALE DATA PROCESSING METHOD

(71) Applicant: TOSHIBA TEC KABUSHIKI KAISHA, Tokyo (JP)

(72) Inventor: Tomoki Ueno, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,237

(22) Filed: Jul. 12, 2022

(65) Prior Publication Data

US 2022/0351234 A1  Nov. 3, 2022

Related U.S. Application Data (63) Continuation of application No. 16/713,814, filed on Dec. 13, 2019, now Pat. No. 11,403,662.

(30) Foreign Application Priority Data

May 15, 2019 (JP) ................................. 2019-092360

(51) Int. Cl.
*G06Q 30/00* (2023.01)
*G06Q 30/0207* (2023.01)
(Continued)

(52) U.S. Cl.
CPC ....... *G06Q 30/0236* (2013.01); *G06Q 20/346* (2013.01); *G06Q 20/4014* (2013.01)

(58) Field of Classification Search
None
See application file for complete search history.

(56) References Cited

U.S. PATENT DOCUMENTS

2005/0033680 A1 * 2/2005 Shibusawa ............. G06Q 40/04
705/37
2005/0114753 A1   5/2005 Kumar et al.
(Continued)

FOREIGN PATENT DOCUMENTS

CN    109242530 A    1/2019
JP    2000-137872 A  5/2000
(Continued)

OTHER PUBLICATIONS

First Office Action dated Oct. 11, 2021 issued in CN Application No. 202010031786.9, with English translation, 16 pages.
(Continued)

*Primary Examiner* — Matthew T Sittner
(74) *Attorney, Agent, or Firm* — FOLEY & LARDNER LLP (57) ABSTRACT

A sale data processing device includes a member storage memory configured to store input member specification information, and a processor configured to determine whether or not an acquired sale target is a sale target to be sold only to only a member, on the basis of specification information for specifying the sale target. The processor is configured to execute a settlement process related to the sale target only when the sale target is a sale target to be sold to only a member and the member information is stored in the member storage memory.

8 Claims, 5 Drawing Sheets

(51) Int. Cl.
*G06Q 20/40* (2012.01)
*G06Q 20/34* (2012.01)

(56) References Cited

U.S. PATENT DOCUMENTS

| | | | |
|---|---|---|---|
| 2007/0179850 A1 | 8/2007 | Ganjon et al. | |
| 2007/0265913 A1* | 11/2007 | Brownlee | G06Q 30/02 705/14.66 |
| 2008/0195415 A1 | 8/2008 | Chan et al. | |
| 2009/0037397 A1* | 2/2009 | Wagner | G06Q 30/06 |
| 2010/0306837 A1* | 12/2010 | Ueno | H04L 12/14 726/7 |
| 2011/0191247 A1* | 8/2011 | Dominguez | G06Q 20/4014 705/317 |
| 2013/0006853 A1* | 1/2013 | Amundsen | G06Q 40/00 705/40 |
| 2014/0337144 A1 | 11/2014 | Seymour | |
| 2015/0332369 A1 | 11/2015 | Nakane | |
| 2016/0155203 A1* | 6/2016 | Gotanda | G06Q 20/20 705/33 |
| 2016/0379219 A1 | 12/2016 | Ariga | |
| 2017/0286662 A1* | 10/2017 | Kitagawa | G07F 7/0873 |
| 2018/0285786 A1* | 10/2018 | Jarrett | G06Q 10/025 |

FOREIGN PATENT DOCUMENTS

| | | |
|---|---|---|
| JP | 2000-149147 A | 5/2000 |
| JP | 2017-010550 A | 1/2017 |
| JP | 2018-160161 A | 10/2018 |

OTHER PUBLICATIONS

Notice of Allowance on U.S. Appl. No. 16/713,814 dated Mar. 29, 2022.

U.S. Office Action on U.S. Appl. No. 16/713,814 dated Nov. 9, 2021.

Notice of Reasons for Refusal dated Jan. 24, 2023 issued in JP Application No. 2019-092360, with English translation, 6 pages.

Second Office Action dated Jun. 27, 2022 issued in CN Application No. 202010031786.9, with English translation, 19 pages.

\* cited by examiner

| COMMODITY CODE PORTION 1421 | COMMODITY NAME PORTION 1422 | NORMAL PRICE PORTION 1423 | MEMBER PRICE PORTION 1424 |
|---|---|---|---|
| 0001 | COMMODITY A | 1000 | 800 |
| 0002 | COMMODITY B (FLAT TIRE REPAIR) | | 1000 |
| 0003 | COMMODITY C | 2000 | 2000 |
| 0004 | COMMODITY D (OIL CHANGE) | | 4000 |
| ⋮ | ⋮ | ⋮ | ⋮ |
| ZZZZ | COMMODITY Z | 3000 | 2400 |

| COMMODITY CODE PORTION 1431 | COMMODITY NAME PORTION 1432 | MEMBER PRICE PORTION 1433 | WORK COMMODITY PORTION 1434 |
|---|---|---|---|
| 0002 | COMMODITY B (FLAT TIRE REPAIR) | 1000 | 1 |
| 0004 | COMMODITY D (OIL CHANGE) | 4000 | 1 |
| ⋮ | ⋮ | ⋮ | ⋮ |
| 000N | COMMODITY N | 2400 | 0 |

SALE DATA PROCESSING DEVICE AND SALE DATA PROCESSING METHOD

CROSS-REFERENCE TO RELATED APPLICATIONS

This application is a continuation of U.S. application Ser. No. 16/713,814, filed Dec. 13, 2019, which is based upon and claims the benefit of priority from Japanese Patent Application No. 2019-092360, filed May 15, 2019, the entire contents of each of which are incorporated herein by reference.

FIELD

Embodiments described herein relate to a sale data processing device and a sale data processing method.

BACKGROUND

Stores such as automotive parts stores and bicycle parts stores include commodities to be sold only to members and services (repair of flat tires of bicycles and oil change of automobiles) to be provided only to members (hereinafter, collectively referred to as "member-exclusive commodities"). These member-exclusive commodities can be purchased by members.

When these member-exclusive commodities are sold to members, store clerks in stores confirm that customers are members, confirm whether or not commodities to be sold are member-exclusive commodities, and operate sale data processing devices such as point of sales (POS) terminals to sell the member-exclusive commodities to members. However, in some cases, store clerks forget to confirm whether or not a customer is a member or whether or not a commodity is a member-exclusive commodity and sell member-exclusive commodities to customers who are not members.

DETAILED DESCRIPTION

Embodiments herein provide a sale data processing device capable of allowing a member-exclusive commodity to be sold to only a member and a sale data processing method.

In general, according to some embodiments, a sale data processing device includes a member storage unit (e.g., a memory or a database) configured to store input member specification information, a sale target determination unit (e.g., a processor configured to execute an algorithm or application) configured to determine whether or not an acquired sale target is a sale target capable of being sold to only a member on the basis of specification information for specifying the sale target, and a settlement processing unit (e.g., a processor) configured to execute a settlement process (e.g., a processor) configured to execute a settlement process related to the sale target only when the sale target is a sale target to be sold only to a member and the member information is stored in the member storage unit.

Hereinafter, an exemplary embodiment will be described with reference to the accompanying drawings. In the embodiment, for example, description will be given by adopting a point of sales (POS) terminal used in a store such as an automotive parts store or a bicycle parts store as an example of a sale data processing device. Further, in the embodiment, commodities to be sold to only members among commodities that are sold in a store will be referred to as "member commodities", and services to be provided only to members (for example, bicycle flat tire repair work and automobile oil change work) among services that are provided to customers will be referred to as "work commodities". In addition, the member commodities and the work commodities will be collectively referred to as "member-exclusive commodities". Exemplary embodiments are not limited to the embodiment to be described below. Members are customers who possess member codes (member specification information) that specify the members by registering their names, addresses, phone numbers, and the like in stores or companies operating stores. In addition, both a commodity and a service are "sale targets". However, in the following description, a service is assumed to be one of commodities, and a sale target will be referred to as a commodity in order to facilitate the understanding of description.

Figure 1:
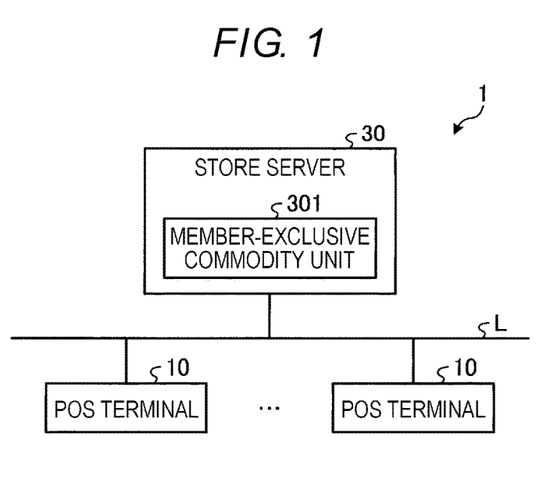
FIG. 1 is a diagram showing a POS system including a POS terminal according to an exemplary embodiment.

FIG. 1 is a diagram showing a POS system including a POS terminal according to the exemplary embodiment. A POS system 1 shown in FIG. 1 is provided in a store. The POS system 1 includes one or a plurality of POS terminals 10 and one store server 30 (in the embodiment, the POS system includes a plurality of POS terminals 10 and one store server 30). The POS terminals 10 and the store server 30 are connected to each other through a communication line such as a local area network (LAN) and can transmit and receive information to and from each other.

The POS terminal 10 executes a sale registration process on a commodity which is sold in the store. The sale registration process includes a process of displaying commodity information, such as a commodity name and a price of the commodity corresponding to a commodity code. The commodity code is specification information for the commodity, and is acquired by reading a symbol attached to the commodity obtained, for example, with a scanner/reader, on a store clerk display unit 18 and a customer display unit 19 of the POS terminal 10, and storing the commodity information in a commodity information unit 132 (see FIG. 2). In the embodiment, two prices, a normal price and a member price are set for the same commodity in a commodity master 142 (a database) (see FIG. 2). The normal price is a price for selling a commodity to (non-member) customers other than members. The member price (a price which is normally cheaper than the normal price) is a price for selling the commodity to members. When a member code is not input, the price of a commodity displayed on the store clerk display unit 18 and the customer display unit 19 is a normal price. A normal price and a member price are stored in the commodity information unit 132. On the other hand, when a member code is input, the price of a commodity displayed on the store clerk display unit 18 and the customer display unit 19 is a member price. In this case, the member prices are stored in the commodity information unit 132. Meanwhile, even when a member code is input, the price of a commodity displayed on the store clerk display unit 18 and the customer display unit 19 may be a normal price.

In addition, the POS terminal 10 executes the above-described sale registration process on a member-exclusive commodity which is sold in a store only when a member code is input. In this case, member prices are displayed on the store clerk display unit 18 and the customer display unit 19, and the member prices are stored in the commodity information unit 132.

The POS terminal 10 executes a settlement process on a commodity on which a sale registration process is performed. The settlement process includes calculating a change amount (e.g., coins) on the basis of a total amount of commodities subjected to a sale registration process and a deposit amount deposited from a customer and displaying the calculated change amount on the store clerk display unit 18 and the customer display unit 19. In addition, the settlement process includes a process of issuing a receipt on which settlement information such as a total amount, a deposit amount, and a coin amount, and commodity information are printed.

The POS terminal 10 transmits commodity information and settlement information related to commodities sold in a predetermined period (for example, one day) to the store server 30 as adjustment reports when a predetermined time period expires.

The store server 30 totalizes the adjustment reports received from the POS terminals 10 to manage sales of a store.

The store server 30 stores member-exclusive commodities that can only be sold to members in a member-exclusive commodity section 301. The store promotes customer membership by providing member commodities and work commodities. In addition, commodity codes for specifying the respective member commodities are attached to the member commodities. In addition, commodity codes for specifying the respective services (commodities) are attached to the work commodities.

A person in charge of or responsible for a store can operate the store server 30 to input member-exclusive commodity information such as a commodity code, a commodity name, and a member price of the member-exclusive commodity. The input member-exclusive commodity information is stored in the member-exclusive commodity section 301. The person in charge of or the responsible for the store can change the member-exclusive commodity information stored in the member-exclusive commodity section 301. The store server 30 transmits the member-exclusive commodity information stored in the member-exclusive commodity section 301 to the POS terminals 10 at a predetermined timing.

Figure 2:
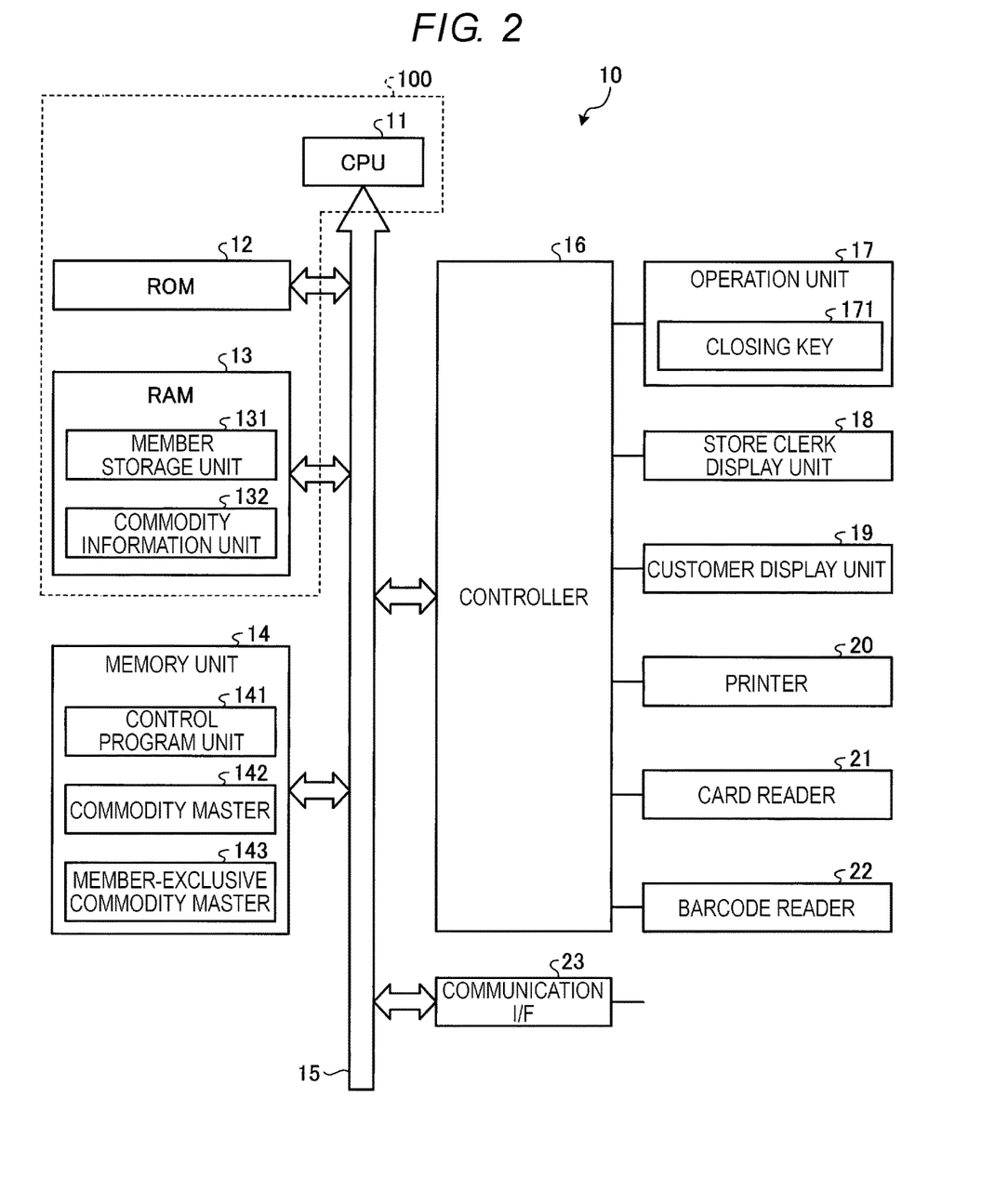
FIG. 2 is a block diagram showing a hardware configuration of the POS terminal according to an exemplary embodiment.

From now on, hardware of the POS terminal 10 will be described. FIG. 2 is a block diagram showing a hardware configuration of the POS terminal 10. As shown in FIG. 2, the POS terminal 10 includes a central processing unit (CPU) 11, a read only memory (ROM) (e.g., a non-transitory memory) 12, a random access memory (RAM) 13, a memory unit 14, and the like. The memory may be in the form of non-transitory computer readable media. The CPU 11 is a main controller. The ROM 12 stores various programs including instructions for execution by the CPU. The RAM 13 stores various data. The memory unit 14 stores various programs. The CPU 11, the ROM 12, the RAM 13, and the memory unit 14 are connected to each other through a data bus 15. The CPU 11, the ROM 12, and the RAM 13 constitute a control unit 100. That is, the control unit 100 executes a control process for the POS terminal 10 to be described later by causing the CPU 11 to operate in accordance with a control program stored in the ROM 12 or the memory unit 14 and developed in the RAM 13.

The RAM 13 includes a member storage unit 131 and a commodity information unit 132. The member storage unit 131 stores a member code which is read by a card reader 21 (to be described later) and is stored in a member card carried by a member. The commodity information unit 132 stores commodity information (a commodity code, a commodity name, a commodity price, and the like) of a commodity on which a sale registration process is performed by the POS terminal 10.

The memory unit 14 includes a control program unit 141, a commodity master 142, and a member-exclusive commodity master 143. The control program unit 141 stores a program for performing a control process of the POS terminal 10. The commodity master 142 stores commodity information of a commodity in association with a commodity code for specifying the commodity. The member-exclusive commodity master 143 stores member-exclusive commodity information (that is, member-exclusive commodity information stored in the member-exclusive commodity section 301) which is received from the store server 30.

In addition, the control unit 100 is connected to an operation unit 17, the store clerk display unit 18, the customer display unit 19, a printer 20, the card reader 21, and a barcode reader 22 through the data bus 15 and a controller 16.

The operation unit 17 is a keyboard including a closing key (a closing indicator) 171. The closing key 171 is operated when a transaction with a customer is terminated (i.e., closes out or completes the transaction). The operation unit 17 includes a key for designating a work commodity. When a member desires a work commodity, a store clerk operates a key corresponding to the work commodity. Then, a commodity code specifying the work commodity associated with the operated key is generated. In some embodiments, the closing key may be a button.

The store clerk display unit 18, which is, for example, a liquid crystal display device, displays information to a store clerk. The customer display unit 19, which is, for example, a liquid crystal display device, displays information to a customer. Display units 18, 19 have screens or panels on which information is shown.

The printer 20 is a printer embedded into the POS terminal 10. The printer 20 prints commodity information and settlement information on a receipt and issues the receipt. The card reader 21 electrically or magnetically reads a member code stored in a member card. In addition, the card reader 21 reads information from a medium such as a credit card. The POS terminal 10 executes the settlement process for a customer on the basis of the read information.

The barcode reader 22 is a device that optically reads a symbol such as a barcode or a two-dimensional code attached to a commodity. The barcode reader 22 may be configured to read a symbol on the basis of an image obtained by capturing the symbol.

In addition, the control unit (controller) 100 is connected to a communication interface I/F 23 through the data bus 15. The communication I/F 23 is connected to the store server 30 or another POS terminal 10 through a communication line L and can transmit and receive information thereto and therefrom.

Figure 3:
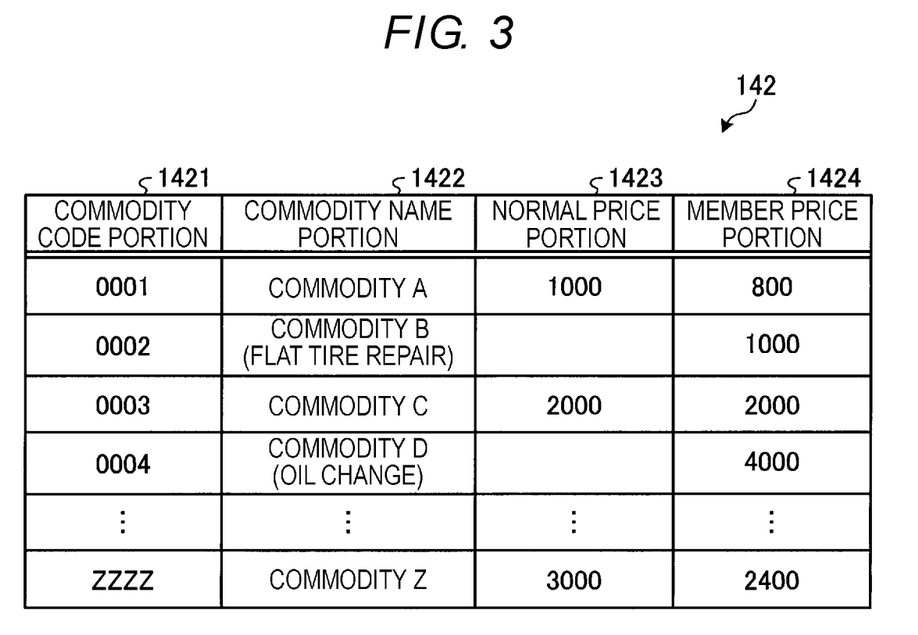
FIG. 3 is a diagram showing a memory configuration of a commodity master according to an exemplary embodiment.

From now on, the commodity master 142 will be described. The commodity master 142 stores a commodity name, a normal price, and a member price of a commodity in association with a commodity code specifying the commodity. Regarding the member price, a price cheaper than a normal price can be set in some embodiments. A normal price and a member price are set for a normal commodity. Only a member price is set for a member-exclusive commodity.

FIG. 3 is a diagram showing a memory configuration of the commodity master 142. As shown in FIG. 3, the commodity master 142 includes a commodity code section 1421, a commodity name section 1422, a normal price section 1423, and a member price section 1424. The commodity code section 1421 stores a commodity code for specifying a commodity. The commodity name section 1422 stores a commodity name of a commodity specified by a commodity code stored in the commodity code section 1421 in association with the commodity code. The normal price section 1423 stores a normal price of a commodity specified by a commodity code stored in the commodity code section 1421 in association with the commodity code. The member price section 1424 stores a member price of a commodity specified by a commodity code stored in the commodity code section 1421 in association with the commodity code.

For example, regarding a commodity code "0001", a commodity name is a "commodity A", a normal price is 1000 yen, and a member price is 800 yen. That is, the commodity A is sold for 1000 yen to customers who are not members and is sold for 800 yen to members. In addition, regarding a commodity of a commodity code "0002", a commodity name is "commodity B (flat tire repair)", a normal price is not set, and a member price is 800 yen. That is, the commodity B is a member-exclusive commodity (the commodity B is a work commodity provided to only members) which is sold for 800 yen to members and is not sold to customers who are not members. In addition, regarding a commodity of a commodity code "0003", a commodity name is a "commodity C", a normal price is 1000 yen, and a member price is 1000 yen. That is, the normal price and the member price of the commodity C are the same, and the commodity C is sold for 1000 yen to members and non-members alike.

Figure 4:
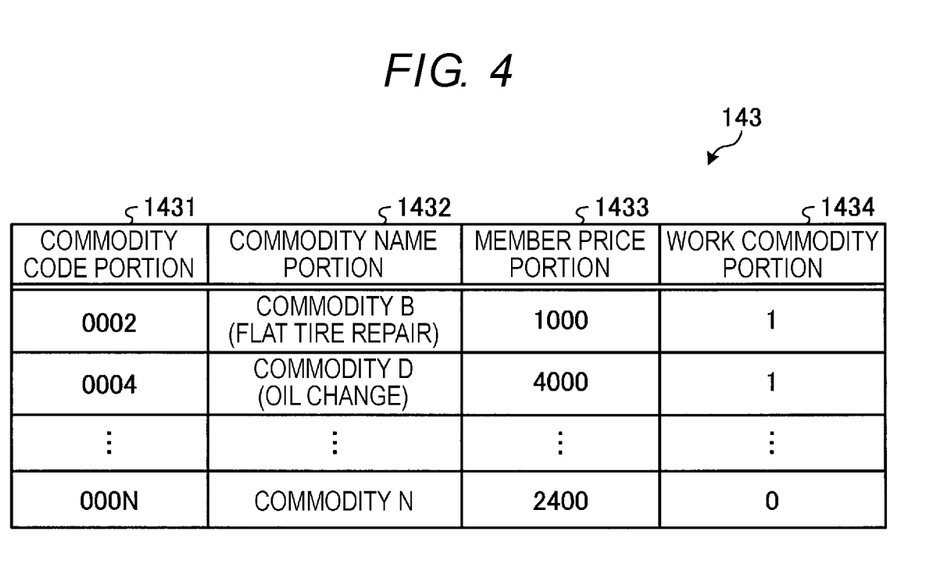
FIG. 4 is a diagram showing a memory configuration of a member-exclusive commodity master according to an exemplary embodiment.

Referring now to FIG. 4, the member-exclusive commodity master 143 will be described. The member-exclusive commodity master 143 stores member-exclusive commodity information of a member-exclusive commodity that can be sold to only members. FIG. 4 is a diagram showing a memory configuration of the member-exclusive commodity master 143. As shown in FIG. 4, the member-exclusive commodity master 143 includes a commodity code section 1431, a commodity name section 1432, a member price section 1433, and a work commodity section 1434. The commodity code section 1431 stores a commodity code for specifying a member-exclusive commodity. The commodity name section 1432 stores a commodity name of a member-exclusive commodity specified by a commodity code stored in the commodity code section 1421 in association with the commodity code. The member price section 1433 stores a member price of a member-exclusive commodity specified by a commodity code stored in the commodity code section 1421 in association with the commodity code. The work commodity section 1434 stores a flag indicating whether or not a member-exclusive commodity stored in the member-exclusive commodity master 143 is a work commodity, in association with a commodity code stored in the commodity code section 1421. A member-exclusive commodity for which a flag "1" is stored in the work commodity section 1434 is a work commodity. A member-exclusive commodity for which a flag "0" is stored in the work commodity section 1434 is not a work commodity (that is, a "member commodity").

Figure 5:
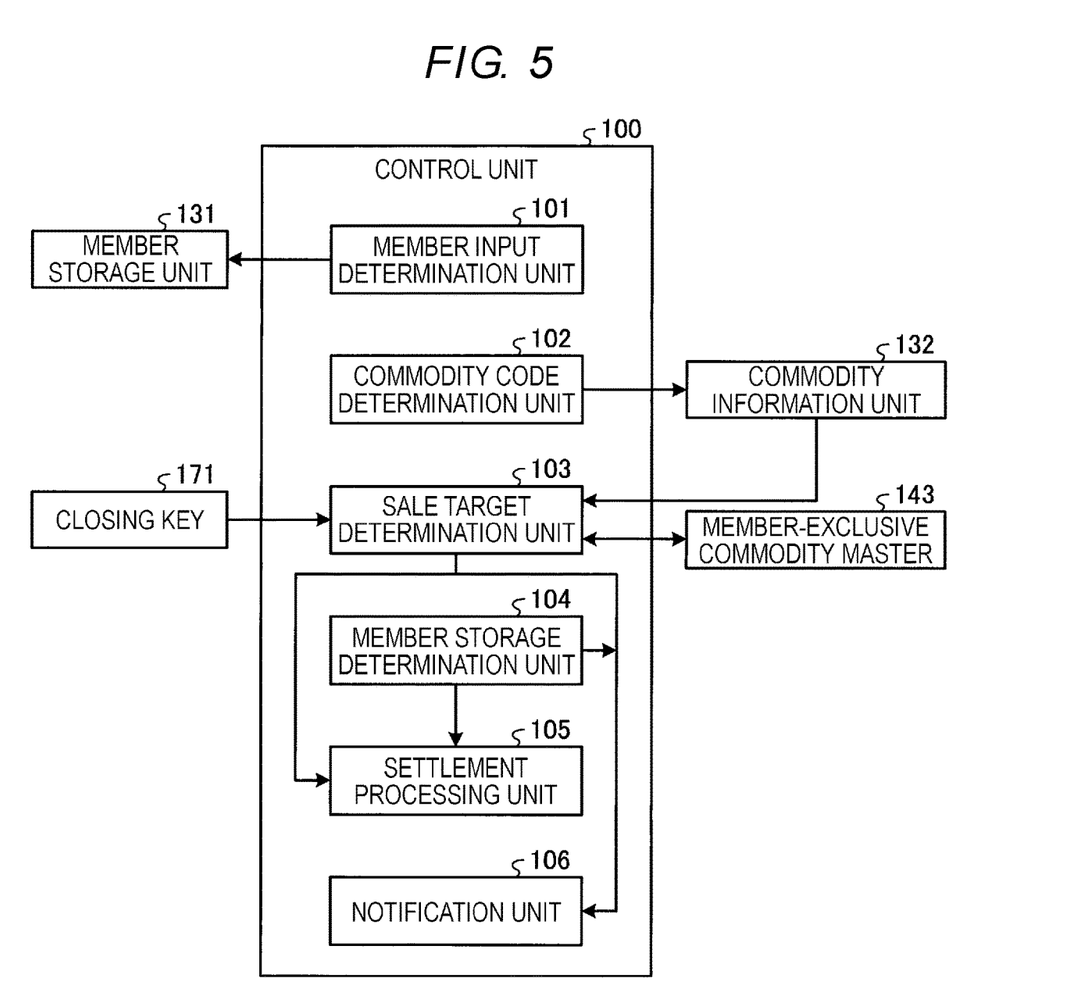
FIG. 5 is a functional block diagram showing a functional configuration of the POS terminal according to an exemplary embodiment.

Referring now to FIG. 5, a functional configuration of the POS terminal 10 will be described. FIG. 5 is a functional block diagram showing a functional configuration of the POS terminal 10. The control unit 100 of the POS terminal 10 is configured to function as a member input determination unit 101, a commodity code determination unit 102, a sale target determination unit 103, a member storage determination unit 104, a settlement processing unit 105, and a notification unit (notifier or notification emitter) 106 in accordance with a control program stored in the ROM 12 or the memory unit 14 and developed in the RAM 13.

The member input determination unit 101 determines whether or not a member code read by the card reader 21 is input. When the member input determination unit 101 determines that a member code is read, the member code is stored in the member storage unit 131.

The commodity code determination unit 102 determines whether or not a commodity code for specifying a commodity is acquired on the basis of a symbol attached to the commodity read by the barcode reader 22. When the commodity code determination unit 102 determines that a commodity code is acquired, commodity information (a commodity code, a commodity name, a price, and the like of the commodity), which is acquired from the commodity master 142 on the basis of the commodity code, is stored in the commodity information unit 132. When a member code is stored in the member storage unit 131, the commodity code determination unit 102 stores a member price in the commodity information unit 132 and displays the member price on the store clerk display unit 18 and the customer display unit 19. When a member code is not stored in the member storage unit 131, the commodity code determination unit 102 stores a normal price and a member price in the commodity information unit 132 and displays the normal price on the store clerk display unit 18 and the customer display unit 19.

The sale target determination unit 103 determines whether or not a sale target specified by an acquired commodity code is a member-exclusive commodity on the basis of the commodity code. Specifically, when the closing key 171 is operated, the sale target determination unit 103 retrieves the member-exclusive commodity master 143 on the basis of commodity codes stored in the commodity information unit 132, and determines whether or not a member-exclusive commodity is included in commodities specified by the commodity codes stored in the commodity information unit 132.

The member storage determination unit 104 determines whether or not a member code is stored in the member storage unit 131.

When a sale target is a member-exclusive commodity and a member code is stored in the member storage unit 131, the settlement processing unit 105 executes a settlement process related to the member-exclusive commodity. Specifically, when the sale target determination unit 103 determines that a member-exclusive commodity is included in commodity codes stored in the commodity information unit 132 and the member storage determination unit 104 determines that a member code is stored in the member storage unit 131, the settlement processing unit 105 executes a settlement process related to the member-exclusive commodity.

When a sale target is a member-exclusive commodity and a member code is not stored in the member storage unit 131, the notification unit 106 generates a first message indicating that the member-exclusive commodity is not available for sale. Specifically, when the sale target determination unit 103 determines that a member-exclusive commodity is included in commodity codes stored in the commodity information unit 132 and the member storage determination unit 104 determines that a member code is not stored in the member storage unit 131, the notification unit 106 generates the first message indicating that the member-exclusive commodity is not available for sale. The first message is displayed on, for example, the store clerk display unit 18 and/or on the customer display unit 19.

In addition, the notification unit 106 generates a second message for promoting the input of a member code before giving notice of the first message. Specifically, when the sale target determination unit 103 determines that a member-exclusive commodity is included in commodity codes stored in the commodity information unit 132 and the member storage determination unit 104 determines that a member code is not stored in the member storage unit 131, the notification unit 106 generates the second message for promoting the input of a member code before giving notice of the first message.

When the notification unit 106 generates the second message, the member input determination unit 101 determines whether or not a member code read by the card reader 21 is input. When it is determined that a member code is read, the member input determination unit 101 stores the member code in the member storage unit 131. The member storage determination unit 104 determines whether or not a member code is stored in the member storage unit 131.

In addition, when a member-exclusive commodity is a work commodity related to a service to be provided to a member, the notification unit 106 generates an instruction for starting work of the service after a settlement process related to the member-exclusive commodity is completed. Specifically, when a member-exclusive commodity is a work commodity in a case where the sale target determination unit 103 determines that a member-exclusive commodity is included in commodity codes stored in the commodity information unit 132 and the member storage determination unit 104 determines that a member code is stored in the member storage unit 131, the notification unit 106 generates an instruction for starting work of the service after a settlement process related to the member-exclusive commodity is completed.

Figure 6:
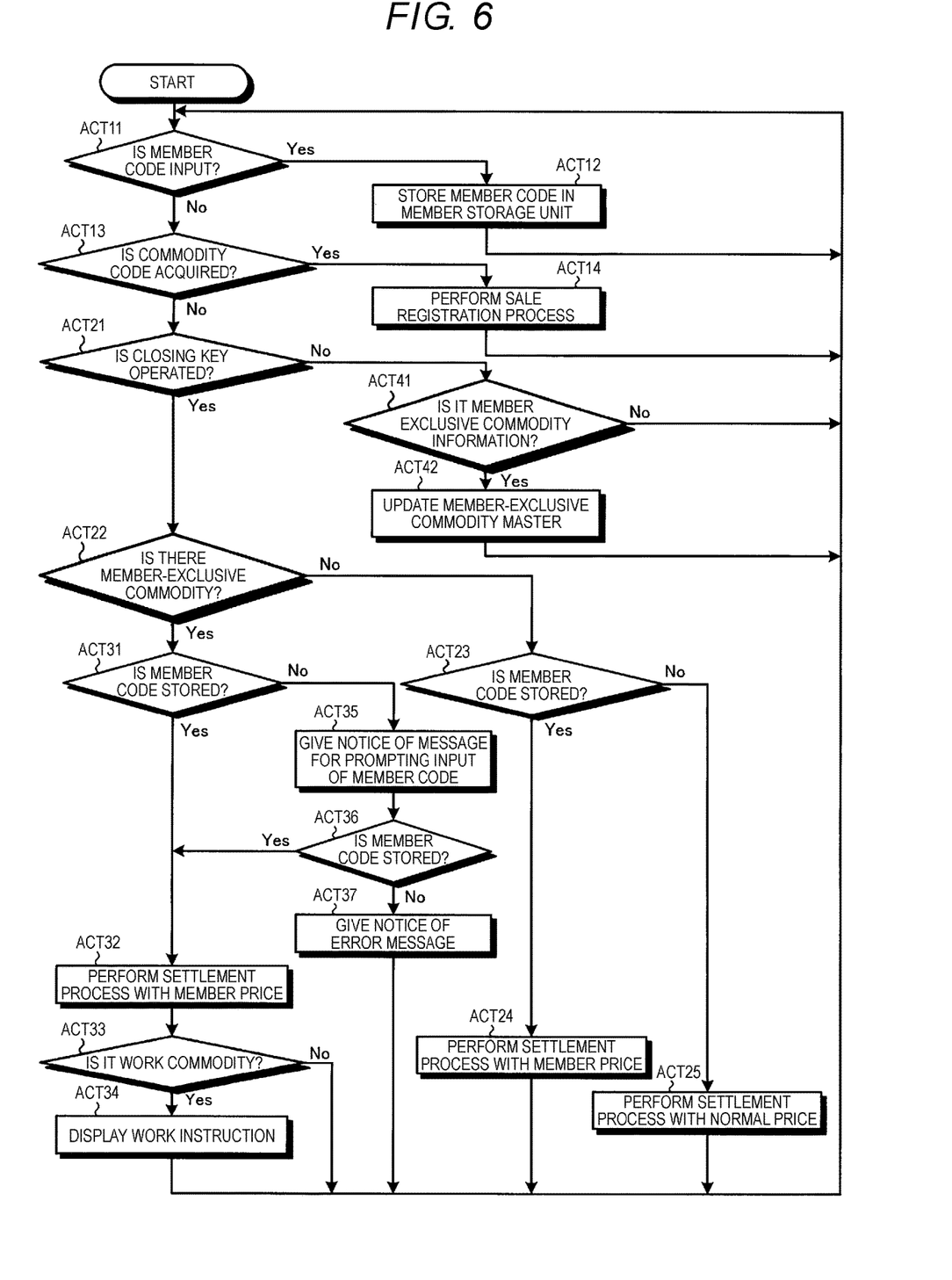
FIG. 6 is a flowchart showing a flow of a control process of the POS terminal according to an exemplary embodiment.

Now referring to FIG. 6, the control of the POS terminal 10 will be described. FIG. 6 is a flowchart showing a control process of the POS terminal 10. The member input determination unit 101 of the POS terminal 10 determines whether or not a member code read by the card reader 21 is input (ACT11). When it is determined that a member code is input (Yes in ACT11), the member input determination unit 101 stores the member code input in the member storage unit 131 (ACT12). The control unit 100 then returns to ACT11.

When it is determined that a member code is not input (No in ACT11), the commodity code determination unit 102 determines whether or not a commodity code for specifying a commodity is acquired on the basis of a symbol read by the barcode reader 22 (ACT13). In a case where it is determined that a commodity code is acquired on the basis of the symbol read by the barcode reader 22 (Yes in ACT13), the commodity code determination unit 102 executes a sale registration process on the basis of the acquired commodity code and stores commodity information (a commodity code, a commodity name, a commodity price, a member price, and the like) acquired from the commodity master 142 in the commodity information unit 132 (ACT14). When a member code is stored in the member storage unit 131, the commodity code determination unit 102 stores a member price in the commodity information unit 132 and displays the member price on the store clerk display unit 18 and the customer display unit 19 in ACT14. When a member code is not stored in the member storage unit 131, the commodity code determination unit 102 stores a normal price and a member price in the commodity information unit 132 and displays the normal price on the store clerk display unit 18 and the customer display unit 19 in ACT14. The control unit 100 then returns to ACT11.

When it is determined that a commodity code is not acquired (Yes in ACT13), the control unit 100 determines whether or not the closing key 171 is operated (ACT21). When it is determined that the closing key 171 is operated (Yes in ACT21), the control unit 100 retrieves the member-exclusive commodity master 143 on the basis of commodity codes stored in the commodity information unit 132, and determines whether or not a member-exclusive commodity is included in commodities stored in the commodity information unit 132 (ACT22). When it is determined that a member-exclusive commodity is not included in the commodities stored in the commodity information unit 132 (No in ACT22), the control unit 100 determines whether or not a member code is stored in the member storage unit 131 (ACT23). When it is determined that a member code is stored in the member storage unit 131 (Yes in ACT23), the control unit 100 executes a settlement process by applying a member price to the commodities stored in the commodity information unit 132 (ACT24). The control unit 100 then returns to ACT11. In addition, when it is determined that a member code is not stored in the member storage unit 131 (No in ACT23), the control unit 100 executes a settlement process by applying a normal price to the commodities stored in the commodity information unit 132 (ACT25). In addition, the control unit 100 returns to ACT11.

When it is determined that a member-exclusive commodity is included in the commodities stored in the commodity information unit 132 (Yes in ACT22), the member storage determination unit 104 determines whether or not a member code is stored in the member storage unit 131 (ACT31). When it is determined that a member code is stored in the member storage unit 131 (Yes in ACT31), the settlement processing unit 105 executes a settlement process by applying a member price to a member-exclusive commodity stored in the commodity information unit 132 (ACT32). The control unit 100 determines whether or not the member-exclusive commodity is a work commodity on the basis of a flag stored in the work commodity section 1434 (ACT33). When it is determined that the member-exclusive commodity stored in the commodity information unit 132 is a work commodity (Yes in ACT33), the notification unit 106 generates an instruction for starting work of a service related to the work commodity (ACT34). The control unit 100 then returns to ACT11. In addition, when it is determined that the member-exclusive commodity stored in the commodity information unit 132 is not a work commodity (No in ACT33), the control unit 100 returns to ACT11, skipping ACT34.

When it is determined that a member code is not stored in the member storage unit 131 (No in ACT31), the notification unit 106 generates a second message for promoting the input of a member code (ACT35). The member storage determination unit 104 determines whether or not a member code is input and stored in the member storage unit 131 (ACT36). When the member input determination unit 101 determines that a member code is input and stored in the member storage unit 131, the member storage determination unit 104 determines that a member code is input and proceeds to ACT32. When, for example, a cancellation key (not shown) is operated, the member storage determination unit 104 may determine that a member code is not input. When it is determined that a member code is stored (Yes in ACT36), the control unit 100 executes the processes of ACT32 to ACT34 and returns to ACT11. However, when it is determined that a member code is not input (No in ACT36), the notification unit 106 generates a first message indicating that the member-exclusive commodity is not available for sale (ACT37). Then, the control unit 100 returns to ACT11.

The POS terminal 10 of the embodiment includes the member storage unit 131 that stores member specification information which is input, the sale target determination unit 103 that determines whether or not an acquired sale target is a member-exclusive commodity on the basis of a commodity code for specifying the sale target, and the settlement processing unit 105 that executes a settlement process related to the member-exclusive commodity only when the sale target is a member-exclusive commodity and a member code is stored in the member storage unit 131. For this reason, the POS terminal 10 of the embodiment can sell member-exclusive commodities to only members.

In addition, when a sale target is a member-exclusive commodity and a member code is not stored in the member storage unit 131, the POS terminal 10 of the embodiment includes the notification unit 106 that generates a first message indicating that the member-exclusive commodity is not available for sale. For this reason, the POS terminal 10 of the embodiment can sell member-exclusive commodities to only members.

Further, in the POS terminal 10 of the embodiment, the notification unit 106 generates a second message for promoting the input of a member code before giving notice of the first message. For this reason, it is possible to prompt a member who has forgotten to input a member code to input a member code.

Further, in the POS terminal 10 of the embodiment, when a sale target is a member-exclusive commodity (work commodity) related to the provision of a service, the notification unit 106 generates an instruction for starting work for providing the service after a settlement process related to the member-exclusive commodity is terminated. For this reason, it is possible to sell work commodities to only members.

While certain embodiments have been described, these embodiments have been presented by way of example only, and are not intended to limit the scope of the invention. The novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, the sale target determination unit 103 determines in ACT22 whether or not a member-exclusive commodity is included, and then the member storage determination unit 104 determines in ACT31 whether or not a member code is stored. However, the embodiment is not limited thereto, and the member storage determination unit 104 may determine in ACT22 whether or not a member code is stored, and then the sale target determination unit 103 may determine in ACT31 whether or not a member-exclusive commodity is included.

Further, in the embodiment, member-exclusive commodity information stored in the member storage unit 131 is created by the store server 30 and is transmitted to the POS terminal 10. However, the embodiment is not limited thereto, the member-exclusive commodity information stored in the member storage unit 131 may be created by, for example, a head office server (not shown) which is a higher-order server of the store server 30. In this case, the created member-exclusive commodity information is transmitted from the head office server to the POS terminal 10 through the store server 30.

Further, in the embodiment, when the closing key 171 is operated, the sale target determination unit 103 determines whether or not a sale target specified by a commodity code stored in the commodity information unit 132 is a member-exclusive commodity on the basis of an acquired commodity code. However, the embodiment is not limited thereto. For example, when a commodity code is acquired in ACT13, it may be determined whether or not a corresponding commodity is a member-exclusive commodity. In this case, the processes of ACT22 to ACT37 are performed instead of the process of ACT14.

Further, in the embodiment, when the closing key 171 is operated, it is determined in ACT23 or ACT31 whether or not a member code is stored in the member storage unit 131. However, the embodiment is not limited thereto. For example, when a commodity code is acquired in ACT13, it may be determined whether or not a member code is stored in the member storage unit 131. In this case, when a customer is a member, a member price can be displayed as a commodity price in ACT14. In addition, when a customer is not a member, a normal price (a first price) can be displayed as a commodity price in ACT14.

Further, in the embodiment, member-exclusive commodity information related to a member-exclusive commodity is stored in both the commodity master 142 and the member-exclusive commodity master 143. However, the embodiment is not limited thereto, and member-exclusive commodity information related to a member-exclusive commodity may be stored in only the member-exclusive commodity master 143. Further, in the commodity master 142, with respect to a member-exclusive commodity, information indicating that a commodity is a member-exclusive commodity may be stored in association with a commodity code. In this case, the member-exclusive commodity master 143 is not necessary, and in the process of ACT22, the commodity master 142 is retrieved and it is determined whether or not a member-exclusive commodity is included in commodities stored in the commodity information unit 132.

Further, in at least one embodiment, a member-exclusive commodity in a store such as an automotive parts store or a bicycle parts store is described. However, the embodiment is not limited thereto, and the embodiment can be applied to a member-exclusive commodity in a store other than the automotive parts store the bicycle parts store.

Meanwhile, a program executed in the sale data processing device of the embodiment is provided by being recorded in a computer-readable recording medium such as a CD-ROM, a flexible disc (FD), a CD-R, or a digital versatile disc (DVD) as a file in an installable format or an executable format.

In addition, a program executed in the sale data processing device of at least one embodiment may be stored on a computer connected to a network such as the Internet or may be configured to be provided by being downloaded through a network. In addition, a program executed in the sale data processing device of the embodiment may be configured to be provided or distributed through a network such as the Internet.

In addition, a program executed in the sale data processing device of the embodiment may be configured to be provided by being incorporated into a ROM or the like in advance.

What is claimed is:

1. A sale data processing device comprising:
   a member storage memory configured to store input member specification information inputted to the memory; and
   a control unit including a processor configured to
      receive, from a server, member-exclusive commodity information and normal commodity information stored in the memory at a predetermined time;
      determine, based on sale target specification information, whether or not an acquired sale target is a member-exclusive sale target to be sold only to a member;
      execute, responsive to determining that the sale target is a member-exclusive sale target, a settlement process for the member-exclusive sale target only when the member information is stored in the member storage memory, a member price being set for the member-exclusive sale target, and the normal commodity information being information in which a normal price and the member price are set for the normal commodity;
      generate, responsive to determining the sale target is a member-exclusive sale target and the member information is not stored in the member storage memory, a first message indicating that the sale target is not available for sale;
      generate a second message to prompt input of the member information before generation of the first message, the first message and the second message being displayed on at least one display screen visible to at least one of a store clerk or a customer; and
      generate, responsive to determining that the sale target is a sale target related to a service to be provided to a member, an instruction for starting work of the service after the settlement process related to the sale target is completed.

2. The device according to claim 1, further comprising a closing indicator,
   wherein, upon operation of the closing indicator, the processor executes sale target determination and settlement processing to complete a transaction.

3. The device according to claim 1, wherein the member specification information is associated with a member code stored on a member card.

4. A method of controlling a sale data processing device, comprising:
   storing, in a member storage memory, input member specification information;
   receiving, from a server, member-exclusive commodity information and normal commodity information stored in the memory at a predetermined time;
   determining, by a processor, whether or not an acquired sale target is a member-exclusive sale target to be sold only to a member;
   executing, by the processor, a settlement process only when the sale target is a member-exclusive sale target and the member specification information is stored in the member storage memory, a member price being set for the member-exclusive sale target, and the normal commodity information being information in which a normal price and the member price are set for the normal commodity;
   generating a first message indicating that the sale target is not available for sale when the sale target is a member-exclusive sale target and the member information is not stored in the member storage memory;
   generating a second message to prompt input of the member information before generation of the first message;
   displaying the first message and the second message on at least one display visible to at least one of a store clerk or a customer; and
   generating, responsive to determining that the sale target is a sale target related to a service to be provided to a member, an instruction for starting the service after the settlement process related to the sale target is completed.

5. The method according to claim 4, wherein the processor is coupled to a server in a store via a data bus.

6. The method according to claim 4, further comprising upon operation of a closing key, executing sale target determination and settlement processing to complete a transaction.

7. A non-transitory computer-readable medium configured to store instructions, which, when executed by a processor, cause the processor to carry out operations comprising:
   causing input member specification information to be stored in a member storage memory;
   receiving, from a server, member-exclusive commodity information and normal commodity information stored in the memory at a predetermined time;
   determining, by the processor, whether or not an acquired sale target is a member-exclusive sale target to be sold only to a member;
   determining, responsive to determining the acquired sale target is not a member-exclusive sale target, a first price of the sale target and a member price of the sale target, wherein the member price is a discounted amount of the first price;
   executing, by the processor, a settlement process using the member price of the sale target when the member specification information is stored in the member storage memory, and the normal commodity information being information in which the first price and the member price are set for the normal commodity;
   generating a first message indicating that the sale target is not available for sale when the sale target is a member-exclusive sale target and the member information is not stored in the member storage memory;
   generating a second message to prompt input of the member information before generation of the first message;
   displaying the first message and the second message on at least one display visible to at least one of a store clerk or a customer; and
   generating, responsive to determining that the sale target is a sale target related to a service to be provided to a member, an instruction for starting the service after the settlement process related to the sale target is completed.

8. The non-transitory computer-readable medium according to claim 7, wherein the member information is associated with a member code stored on a member card.

\* \* \* \* \*